(12) United States Patent
Staton et al.

(10) Patent No.: US 6,734,415 B1
(45) Date of Patent: May 11, 2004

(54) HIGH QUANTUM EFFICIENCY POINT LIGHT DETECTOR

(75) Inventors: Kenneth L. Staton, San Carlos, CA (US); Andreas N. Dorsel, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/415,015

(22) Filed: Oct. 7, 1999

(51) Int. Cl.[7] .................................. H01J 40/14
(52) U.S. Cl. .................. 250/214 R; 250/208.1
(58) Field of Search ............... 250/208.1, 234–236, 250/214 R, 214.1, 227.11; 358/482, 483, 2; 382/312; 356/138, 399

(56) References Cited

U.S. PATENT DOCUMENTS

| | | |
|---|---|---|
| 2,508,408 A | 5/1950 | Liebson |
| 3,886,359 A | 5/1975 | Cheek, Jr. et al. |
| 3,904,818 A * | 9/1975 | Kovac .................. 178/7.1 |
| 3,947,689 A * | 3/1976 | Wagner ................. 250/512 |
| 3,963,942 A | 6/1976 | Sequin et al. |
| 4,010,319 A | 3/1977 | Levine |
| 4,011,442 A | 3/1977 | Engeler |
| 4,263,522 A | 4/1981 | Jensen |
| 4,551,759 A | 11/1985 | Crabtree |
| 4,567,524 A | 1/1986 | Levine |
| 4,860,073 A | 8/1989 | Michon |
| 5,585,652 A | 12/1996 | Kamasz et al. |
| 5,900,949 A * | 5/1999 | Sampas ................. 358/482 |

FOREIGN PATENT DOCUMENTS

JP 403252163 11/1991

OTHER PUBLICATIONS

Electronic Pictures From Charged–Coupled Devices, NASA Tech Briefs, pp. 17–18, Spring, 1979.

* cited by examiner

Primary Examiner—Stephone B. Allen

(57) ABSTRACT

High quantum efficiency point detector system. The system includes a light source generating a light beam having an area and includes a CCD detector with a cell size comparable to the light beam area. The CCD cell may include a single pixel or at least two pixels.

8 Claims, 2 Drawing Sheets exemplary and a CCD may have only a single large cell or fewer than the 25 pixels illustrated in FIG. 1.

HIGH QUANTUM EFFICIENCY POINT LIGHT DETECTOR

FIELD OF THE INVENTION

This invention relates to light detectors and more particularly to high quantum efficiency point light detectors particularly adapted for detecting low levels of fluorescence.

BACKGROUND

In many analytical situations, fluorescing molecules are attached to molecules of interest to aid in their detection. Upon illumination, fluorescence indicates the presence of a tagged moiety. The level of fluorescence is often quite low resulting in a low signal-to-noise ratio.

In systems using a point detector such as a photomultiplier tube (PMT) the achieved signal-to-noise ratio is often limited by the number of photons detected, i.e., by the number of photons that result in the generation of a photoelectron in a photocathode that is subsequently detected as a multi-electron pulse at the anode within the PM. The ratio of the number of electron pulses generated to the number of incident photons is called the quantum efficiency of the detector. PMT's have a quantum efficiency that is significantly lower than one. Although detectors that measure electric charges generated by incident radiation such as charge-coupled devices (CCD's) are known to have a much higher quantum efficiency than PMT's, it has been assumed that the PMT is the best solution available for use as a point detector. This was the case because CCD's, though having higher quantum efficiency, suffer from dark current-related electron shot noise and especially from readout noise.

In multi-pixel (imaging) situations with very long integration times such as in astronomical photography the multiple readout of a CCD has been used. However, the inventors herein are unaware of any prior art realization that a CCD can be modified into a point detector that can outperform a PMT in terms of achieved signal-to-noise ratio.

SUMMARY

The high quantum efficiency point detector system according to the invention includes a light source generating a light beam having an area, and a detector for receiving the light beam, the detector having a cell size comparable to the light beam area. The detector may be any detector that measures electric charges generated by incident radiation such as a charge-coupled device (CCD). The cell may have a single relatively large pixel or it may have an array of two or more pixels. The system further includes a readout capacitor and apparatus for transferring, multiple times, charge from the detector to the capacitor and back. It is preferred that a plurality of transfer and readout capacitors be provided for multiple readouts. Further, readout noise can be reduced by reading out a single CCD element multiple times and averaging the results.

DESCRIPTION OF THE PREFERRED EMBODIMENT

Figure 1:
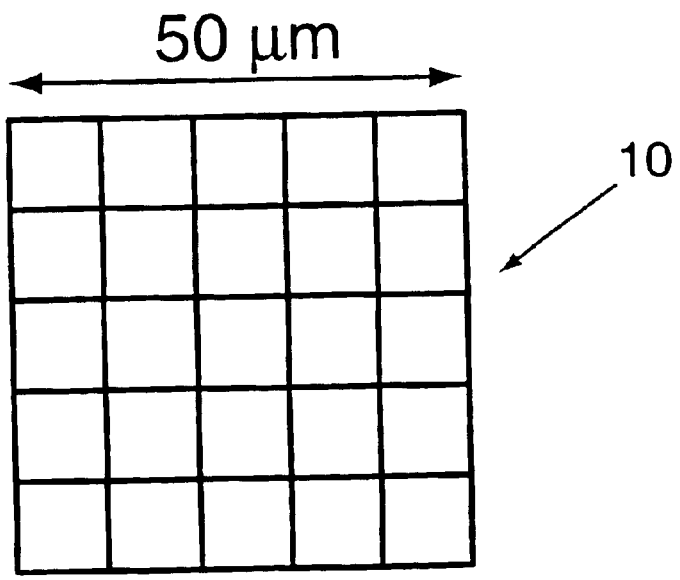
FIG. 1 is a schematic view of a CCD array.

With reference to FIG. 1 a detector such as a CCD array 10 in this embodiment is made up of 25 pixels each pixel approximately 10 μm square. Thus, the overall cell size is 50 μm. The cell size of the CCD array 10 could be as large as desirable for ease of alignment with a light source without increasing dark current to unacceptable levels. The array in FIG. 1 is entirely exemplary and a CCD may have only a single large cell or fewer than the 25 pixels illustrated in FIG. 1.

Figure 2:
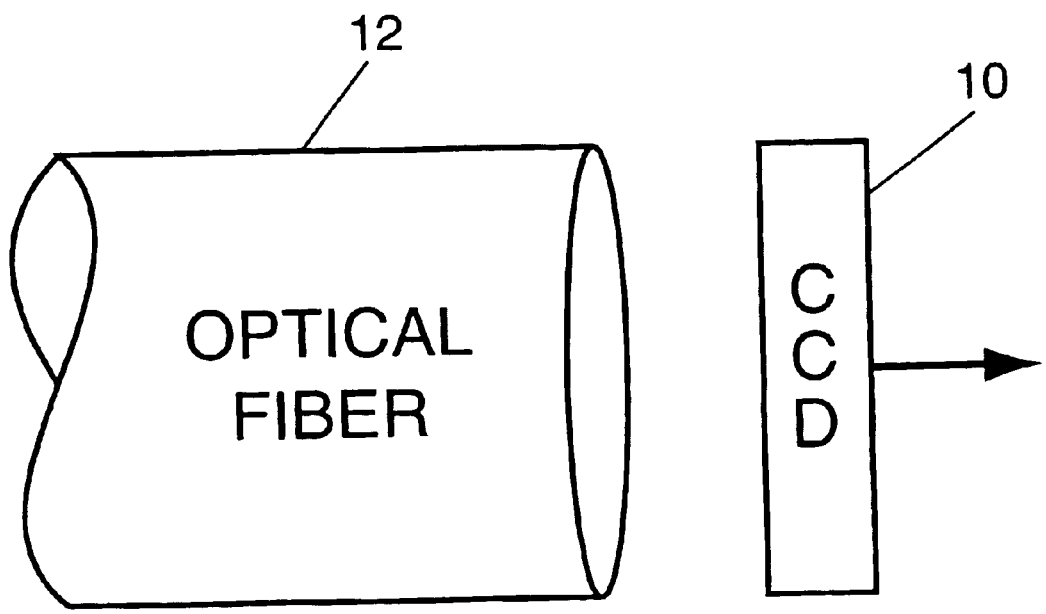
FIG. 2 is a schematic view of an optical fiber-CCD combination.

As an example of the invention, a light source (e.g., the focal spot of a confocal scanner or the end of a fiber) might be imaged onto a single pixel of a CCD array, onto a small number of adjacent pixels of a CCD array or onto a custom made, single pixel CCD. With reference to FIG. 2, an optical fiber 12 is brought almost into contact with the CCD array 10. The CCD 10 will offer higher quantum efficiency than a PMT especially in the (infra) red spectral region and especially for a backthinned and back illuminated CCD. It should be noted that light from the fiber 12 may be imaged onto the array 10.

In operation, the CCD 10 collects light during the duration of a light collection period sometimes referred to as a pixel. After that period, its charge is transferred to a readout capacitor and the voltage across that capacitor can then be sampled. As there is finite transfer noise, multiple transfers result in different numbers of electrons in the readout capacitor and thus in different voltages. By transferring the charge into and out of the readout capacitor multiple times and by averaging the readings, one can diminish the impact of this readout noise by a significant amount.

If the maximum readout frequency is too low to do the multiple readouts within the duration of a single pixel, it is contemplated to build a chip with multiple transfer and readout capacitors. A given pixel charge would then be passed onto a given transfer capacitor and would be bounced back and forth between that capacitor and its readout capacitor for multiple readouts. Meanwhile, the next pixel charge could be passed into the next transfer capacitor and so on, until a cyclic repetition occurs. The number of transfer/readout capacitor pairs will be the smallest integer that is not smaller than the readout/averaging time divided by the pixel time. The readout/averaging time is the total time the charge spends passing through the readout capacitor's circuitry. The time for an individual measurement of the charge in one of the capacitors will be shorter. Many measurements may be averaged.

Figure 3:
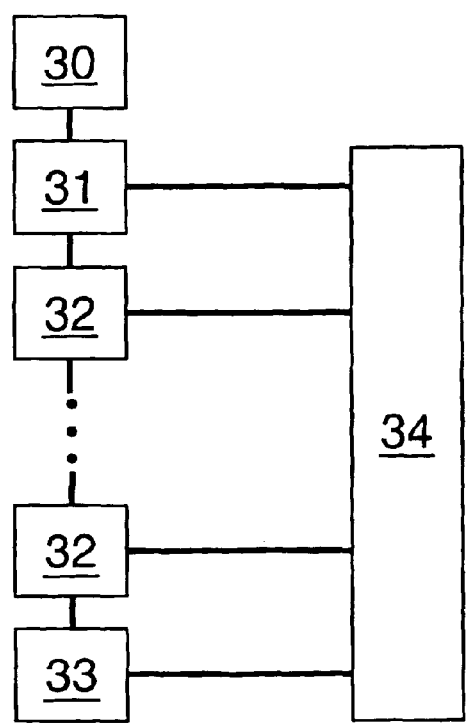
FIG. 3 is a schematic diagram illustrating a pipeline arrangement of readout capacitors.

If multiple capacitors are used for charge to be stored in and read out from while subsequent charge collection processes are in progress, these capacitors may be arranged in a pipeline fashion as shown in FIG. 3. A fist charge is generated in a light-sensitive area 30 and then moved to a first capacitor/readout unit 31. The capacitor/readout unit 31 includes a capacitor 31a and a voltage sampling circuitry 31b for sampling the voltage across the capacitor 31a While a second charge is generated in the light-sensitive area 30, the first charge is read out and cycled back as often as desired. Once the second charge has been generated, the first charge is either dumped or moved into a second capacitor/readout unit 32, while the second charge is moved to the first capacitor/readout unit 31 after which a third charge can be generated in the photo-sensitive area 30. The capacitor/readout unit 32, like the capacitor/readout unit 31, includes a capacitor 32a and circuitry 32b for sampling the voltage across the capacitor 32a. All readings of a given charge taken from different capacitors are averaged to reduce the noise on the charge measurement. This process can be extended in a similar fashion to a large number of capacitors (32 through 33), thus reducing readout noise. As will be appreciated, the capacitor/readout unit 33 includes a capacitor 33a and circuitry 33b to sample the voltage across the capacitor 33a. In this design, any given charge is essentially moved along a line of capacitors to allow it to be read out as often as desired. After all desired readout/averaging is done, the charge is dumped (as in a conventional CCD).

Figure 4:
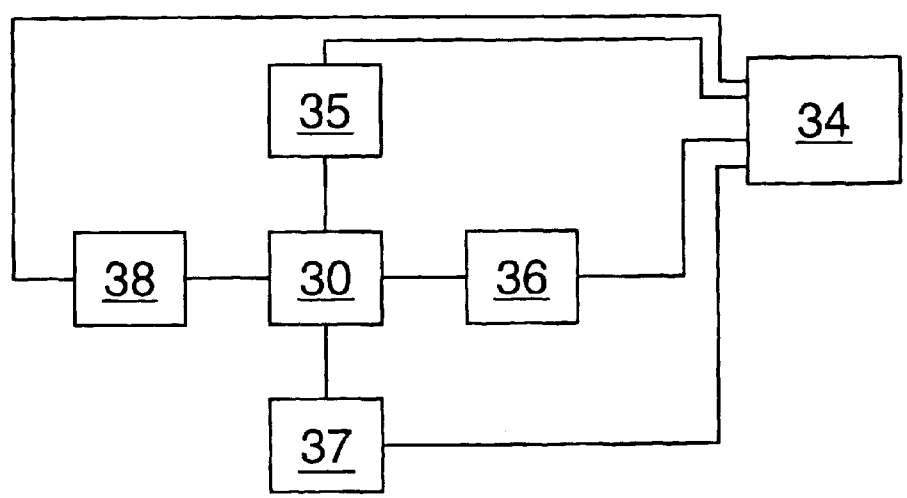
FIG. 4 is a schematic diagram illustrating a cyclic arrangement of readout capacitors.

In an alternate design shown in FIG. 4, there are several (in this case four) capacitors with associated readout circuitry arranged around the light-sensitive area 30. Charge from individual charge generation cycles (pixel times) is transferred to these capacitors, e.g., cycling around. A first charge is moved to capacitor/readout unit 35 and stays there for four pixel cycles for repeated readout. The capacitor/readout unit 35 includes a capacitor 35a and circuitry 35b for sampling the voltage across the capacitor 35a. One pixel cycle later the next charge is moved to capacitor/readout unit 36, another cycle later the next charge is moved to capacitor/readout unit 37. It will be appreciated that the capacitor/readout unit 36 includes a capacitor 36a and circuitry 36b to sample the voltage across the capacitor 36a. Similarly, the capacitor/readout unit 37 includes a capacitor 37a along with circuitry 37b to sample its voltage. The next charge generated is moved to capacitor/readout unit 38 which includes a capacitor 38a and circuitry 38b to sample its voltage. Once the next charge is generated, the charge in capacitor/readout unit 35 is dumped and the new charge is moved there, thus restarting the cyclic acquisition of the data.

The readout values can be accumulated using known methods (e.g., analog-to-digital conversion of resulting voltages and subsequent (weighted) averaging) in a control unit 34.

The impact of dark current and the electron shot noise accompanying it can be minimized either by cooling the CCD or by increasing the photon rate to the point in which the resulting photocurrent exceeds the dark current.

In a specific design the single readout noise might be eight electrons, the pixel time 10 $\mu$s and the readout time 1 $\mu$s; this will result in an effective readout noise of less than three electrons. The higher quantum efficiency of the single large cell CCD of the invention coupled with the fact that PMT#s have excess noise unless used in a photon counting mode (which, if used, limits dynamic range results in better overall performance than a PMT-based detection scheme. In addition, the invention allows easy integration of multiple detectors on a single die, resulting in significant cost savings in a system that, for example, is used to detect more than one (spectral) channel at a time. The invention thus provides a detection scheme that has higher quantum efficiency than a PMT while reducing readout noise and dark current electron shot noise of CCDs.

It is recognized that modifications and variations of the invention will occur to those skilled in the art and it is intended that all such modifications and variations be included within the scope of the appended claims.

What is claimed is:

1. High quantum efficiency point detector system comprising:
   a light source generating a light beam having an area; and
   a detector that measures electric charges generated by the light beam with a cell size comparable to light beam area.

2. The detector system of claim 1 wherein the cell includes a single pixel.

3. The detector system of claim 1 wherein the cell includes at least two pixels.

4. The detector system of claim 1 further including a readout capacitor and means for transferring, multiple times, charges from the detector to the capacitor and back.

5. The detector system of claim 1 further including a plurality of transfer and readout capacitors.

6. The system of claim 1 wherein the detector is a CCD detector.

7. The detector system of claim 5 wherein the plurality of transfer and readout capacitors are arranged in a pipeline configuration.

8. The detector system of claim 5 wherein the plurality of transfer and readout capacitors are arranged in a cyclic pattern around a light sensitive area.

* * * * *